United States Patent [19]

Schmitt

[11] Patent Number: 4,849,845
[45] Date of Patent: Jul. 18, 1989

[54] TRANSIENT SUPPRESSOR
[75] Inventor: Dwight Schmitt, Rockford, Ill.
[73] Assignee: Sundstrand Corporation, Rockford, Ill.
[21] Appl. No.: 261,077
[22] Filed: Oct. 24, 1988
[51] Int. Cl.⁴ .............................................. H02H 3/22
[52] U.S. Cl. ....................................... 361/56; 361/86; 361/91; 361/111
[58] Field of Search ..................... 361/54, 55, 56, 86, 361/91, 111

[56] References Cited

U.S. PATENT DOCUMENTS

| 3,449,634 | 6/1969 | Hung | 361/56 |
| 3,524,124 | 8/1970 | Perkinson | 361/86 |
| 3,594,612 | 7/1971 | Gately | 361/55 |
| 3,949,271 | 4/1976 | Nercessian | 361/111 |
| 4,219,856 | 8/1980 | Danfors et al. | 361/111 |

FOREIGN PATENT DOCUMENTS 3119972  12/1982  Fed. Rep. of Germany ........ 361/91

Primary Examiner—A. D. Pellinen
Assistant Examiner—H. L. Williams
Attorney, Agent, or Firm—Wood, Dalton, Phillips, Mason & Rowe

[57] ABSTRACT

An electrical supply has a transient suppressor in which a transistor switch connects a resistor across the supply to dissipate an overvoltage condition. The control for the transistor switch turns the switch on at a first overvoltage condition and turns the switch off when the voltage drops to a level less than that of the first overvoltage level.

7 Claims, 3 Drawing Sheets

TRANSIENT SUPPRESSOR

FIELD OF THE INVENTION

This invention relates to a transient suppressor for an electrical supply in which the suppressor cycles on and off to dissipate an overvoltage condition.

BACKGROUND OF THE INVENTION

An electrical supply typically serves loads which have a varying demand. As the demand changes, the current, which represents kinetic energy, must change. This presents a serious problem when a supply is operating at maximum current and the load is suddenly removed. A voltage transient occurs which may damage system components. Even when the source voltage of the supply is actively regulated, the regulator response time is finite and the voltage transient may not be completely controlled.

Transient suppression circuits have used a Zener diode clamp which conducts upon occurrence of an overvoltage condition. However, the typical Zener breakdown voltage varies with temperature. Where tight control of voltage transients is required, a Zener suppressor circuit is not satisfactory.

Nercessian U.S. Pat. No. 3,949,271 shows a transient suppressor circuit in which a differential amplifier is responsive to system voltage and with the occurrence of an overvoltage condition turns on a switch which conducts current through a shunt resistor circuit. The differential amplifier turns off, opening the switch, when the voltage returns to normal. The Nercessian circuit will stay on continuously as long as the voltage remains greater than normal. This operation may result in damage to the shunt resistor or the transistor with higher energy transients.

SUMMARY OF THE INVENTION

In accordance with the invention, a transient suppressor has a resistor and switch connected across the terminals of the electrical supply power source. A transient sensor and control responsive to the source voltage turns the switch on at a first overvoltage level and turns the switch off at a second voltage level less than the first voltage level. More particularly, in the preferred embodiment, both the first overvoltage level and the second voltage level are greater than the normal rated voltage for the source.

Another feature of the invention is that a transient suppressor for a DC source has a resistor, switch and control while a suppressor for an AC source has a first resistor, switch and control responsive to a source voltage of one polarity and a second resistor, switch and control responsive to source voltage of the opposite polarity.

A further feature of the invention is that the sensor and control includes a comparator biased to cause conduction of the switch upon occurrence of the first overvoltage condition, with a feedback circuit which modifies the comparator operation so that the switch is turned off at a second voltage level, providing hysteresis in the switching operation.

And another feature of the invention is that the control includes a counter which counts switch transitions between on and off, and means responsive to a selected count for inhibiting operation of the transient suppressor.

Further features and advantages of the invention will readily be apparent from the following specification and from the drawings, in which.

Figure 1:
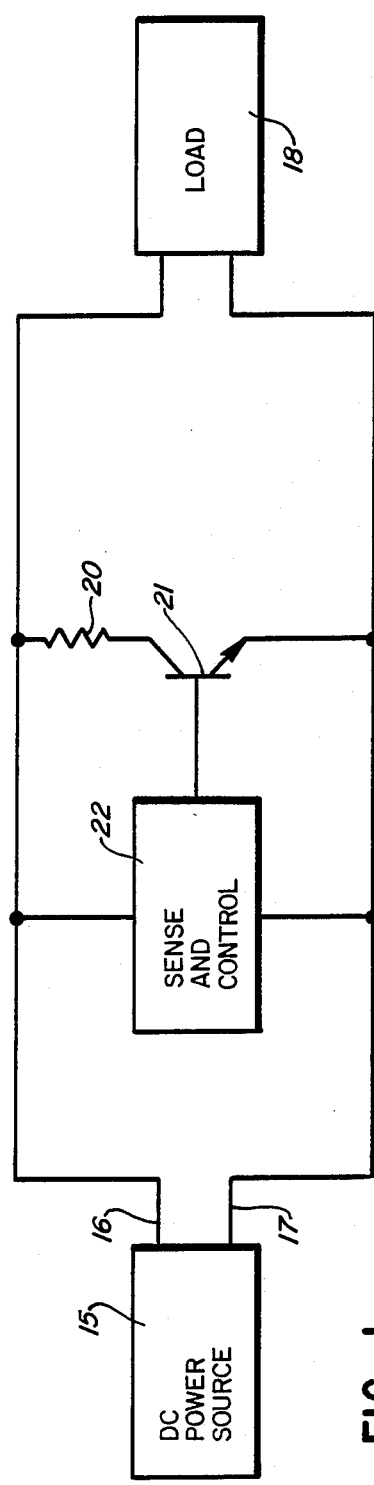
FIG. 1 is a block diagram of the transient suppressor for an electrical supply with a DC source.

An electrical supply having a DC power source 15 is shown in FIG. 1. The source has two terminals 16, 17, to which a load 18 is connected. A transient suppressor includes an energy dissipating resistor 20 connected in series with the collector-emitter circuit of switching transistor 21 across the power source terminals. A sense and control circuit 22 is responsive to the voltage from power source 15 and has an output connected with the base of transistor 21 to turn the transistor on and off. When the transistor conducts, current through resistor 20 dissipates transient energy causing the source voltage to drop. In accordance with the invention, the sense and control circuit 22 turns the switch on at a first overvoltage level, greater than the normal rated voltage of the power source and turns the transistor off at a lower voltage which may also be greater than the normal rated voltage the source. This difference in the turn on and turn off voltages is sometimes referred to herein as hysteresis in the transient suppressor switch.

Figure 4:
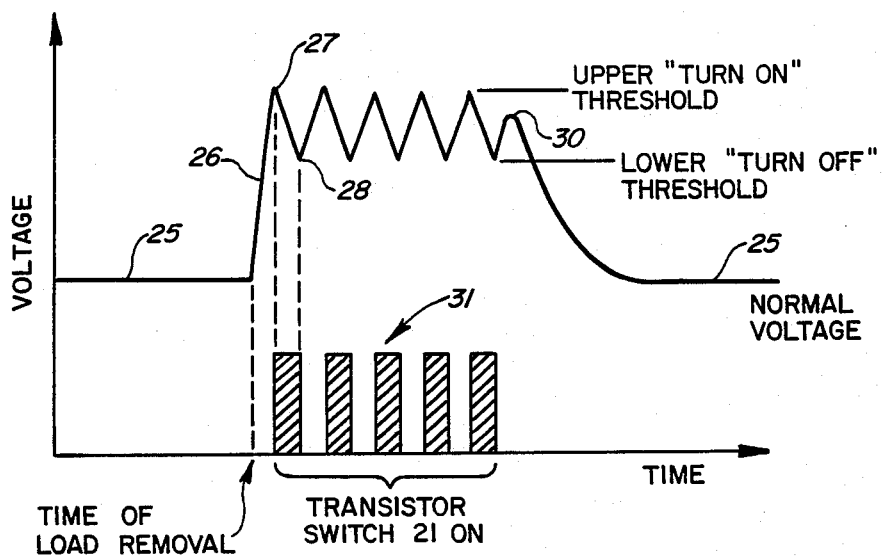
FIG. 4 is a plot of source voltage as a function of time, illustrating operation of the transient suppressor.

Operation of the transient suppressor is illustrated in the plot of voltage as a function of time, FIG. 4. Normal voltage of the power source 15 is applied to load 18 as indicated at 25. When the load is removed, a transient voltage increase occurs at 26. At the upper or turn on threshold 27, transistor 21 conducts. Energy is dissipated in resistor 20 and the voltage drops to the lower or turn off threshold 28 which is higher than normal voltage 25 but less than the turn on threshold 27. Following the turn off of transistor 21, the voltage again increases. The cycle of turn on/turn off/turn on continues until the kinetic electrical energy of the system is insufficient for the voltage to reach the turn on level as shown at 30. The voltage then drops to the normal level 25, as may be determined by the characteristics of the power source or by a power source regulator, not shown. The periods of suppressor conduction are indicated at 31. The turn off threshold 28 may, of course, be selected at or below the level of normal voltage 25 as long as the average of the turn on threshold 27 and the turn off threshold 28 is greater than the normal voltage 25.

The voltage levels 27, 28 are selected so that excessive voltage is not applied to components of the load and to avoid exceeding the current handling and dissipation capabilities of resistor 20 and transistor 21. For example, in a VSCF electrical system as shown in Krinickas Ser. No. 267,177, filed Nov. 4, 1988 and assigned to the assignee of this application a DC transient suppressor may be connected with the DC link between the rectifier and the DC to AC converter. The DC link has a nominal operating voltage of 380 volts. The transient suppressor may be designed to turn on at 420 volts and to turn off at 380 volts. The peak current through the suppressor is of the order of 700 amperes; the peak power dissipation is of the order of 200 kilowatts.

Figure 2:
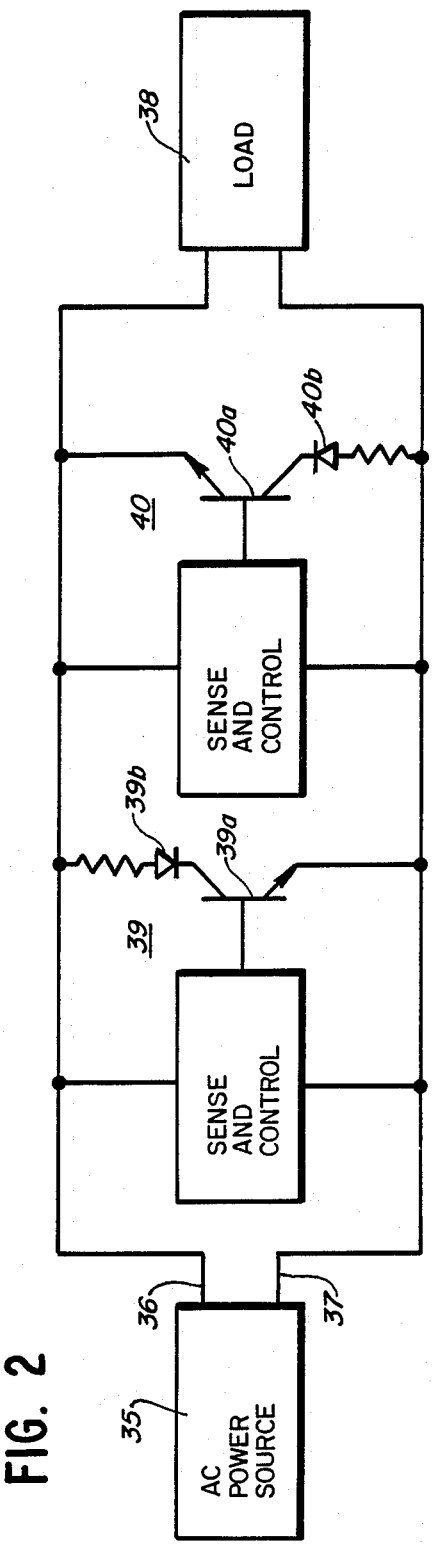
FIG. 2 is a block diagram of the transient suppressor for an electrical supply with an AC source.

A transient suppressor for an electrical system having an AC power source is shown in FIG. 2. The AC power source 35 has terminals 36, 37. Electrical power is supplied to load 38. Two suppressor circuits 39, 40 are connected across the power source terminals 36, 37. The suppressor circuit 39 operates when power source terminal 36 is positive and terminal 37 is negative. Suppressor circuit 40 operates when terminal 37 is positive and terminal 36 negative. The transistor 39a and series connected diode 39b of suppressor circuit 39 are poled oppositely from the transistor 40a and diode 40b of suppressor 40.

Figure 3:
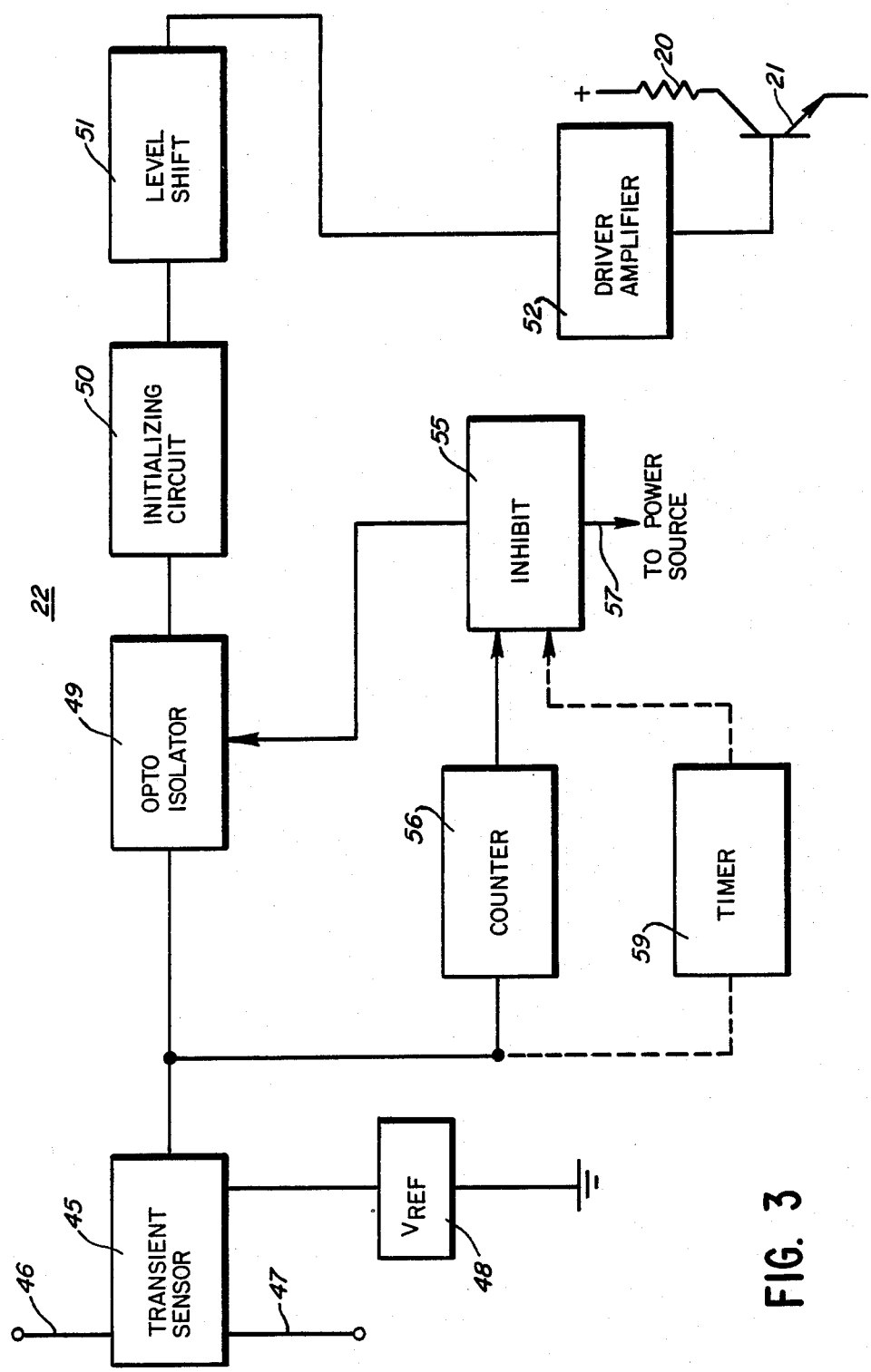
FIG. 3 is a block diagram of the transient suppressor control.

The sense and control circuit 22 is illustrated in a simplified block diagram, FIG. 3. Transient sensor 45 has inputs 46, 47 connected with the terminals of the power source. A voltage reference 48 provides a stable reference with which the system voltage is compared. Upon occurrence of a transient overvoltage condition, a signal is coupled through optical isolator 49 with a control initializing circuit 50 which is operative upon start up of the system to ensure that the transient suppressor is nonconductive. The control signal is connected with a level shift circuit 51 which conditions the control signal to operate driver amplifier 52. Transistor switch 21 is controlled by driver amplifier 52 to turn on and off the transient suppression current through resistor 20. If the system conditions require, two or more transistors 21 or resistors 20 may be connected in parallel.

Where the ratings of resistor 20 and transistor 21 do not permit unlimited continuous operation, a suppressor inhibit circuit 55 is provided. A counter 56 connected with the output of transient sensor 45 counts the repetitions of turn on—turn off for a transient occurrence. When the transient is dissipated, the counter is reset. If the count exceeds a selected number, inhibit circuit 55 blocks the control signal through optical isolator 49 and turns off the transient suppressor. At the same time a signal at 57 from inhibit circuit 55 shuts down the power source to avoid damage to components of the electrical supply or load.

The output of transient sensor 45 may also be connected with a timer 59 as shown in broken lines. The timer provides a minimum off time for the switching transistor 21 so that the transistor is not turned back on before current flow through it is completely turned off.

Figure 5:
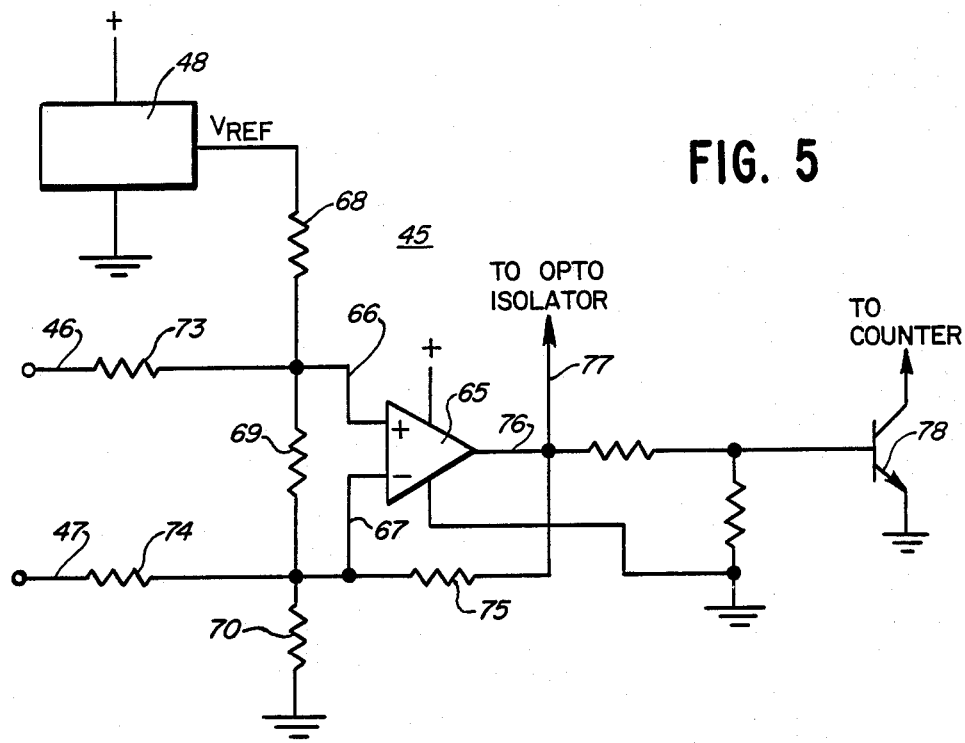
FIG. 5 is a partial schematic diagram of the control illustrating a preferred embodiment of a comparator in the control.

The transient sensor 45 is shown in more detail in the schematic diagram of FIG. 5. A differential amplifier comparator 65 has noninverting and inverting input terminals 66, 67 respectively. Voltage reference 48 has a stable positive output connected through a voltage divider of series connected resistors 68, 69 and 70 with the comparator input terminals. In a DC transient control system, for example, power source terminals 16 and 17 are connected with sensor input terminals 46, 47, respectively, through series resistors 73, 74. A feedback resistor 75 is connected from the output 76 of comparator 65 with inverting input 67.

With the system voltage less than the turn on threshold 27, the output of comparator 65 is low. When a transient voltage condition occurs and the system voltage rises to the turn on threshold, the output of comparator 65 goes high. This provides a control signal at 77 to optical isolator 49 and through isolation transistor 78 to counter 56. Counter 56 is a commercially average binary counter with preset. The high voltage at the output 76 of comparator 65 is coupled through feedback resistor 75 to the inverting input 67 shifting the operating parameters of th comparator so that the voltage at terminals 16, 17 must drop to the turn off threshold 28 before the comparator output goes low. The repetition of suppressor turn on, turn off then continues as described above until the transient is dissipated.

In the AC system of FIG. 2, the inputs of the sensor for transient suppressor 39 are connected to respond to a high positive potential at terminal 36 while the connections for the sensor of suppressor 40 respond to the high positive potential at terminal 37.

I claim:

1. In an electrical supply having a power source with two terminals for connection with a load, said source having a normal rated voltage and being subject to overvoltage transients, a transient suppressor with a resistor and a switch connecting the resistor across the terminals to dissipate the overvoltage energy, the improvement which comprises:
    a transient sensor and control responsive to the source voltage to turn the switch on at a first overvoltage level and to turn the switch off at a second voltage level less than said first voltage level, both said first overvoltage level and said second voltage level being greater than said normal rated voltage.

2. The transient suppressor of claim 1 for a DC source, the suppressor having a resistor, switch and control.

3. The transient suppressor of claim 1 for an AC source, the suppressor having a first resistor, switch and control responsive to source voltage of one polarity and having a second resistor, switch and control responsive to source voltage of the opposite polarity.

4. The transient suppressor of claim 3 having a diode connected in series with each resistor and switch and poled to conduct with opposite source voltages.

5. The transient suppressor of claim 4 in which the switches are transistors poled to conduct with conduction of said diodes.

6. The transient suppressor of claim 1 in which the sensor and control includes:
    a comparator having two inputs and an output with high and low states;
    a source of reference potential connected with an input of the comparator;
    means connecting one terminal of said electrical supply with one input of said comparator;
    means connecting the other terminal of said electrical supply with the other input of said comparator, the comparator being biased by said reference potential source so that the output of the comparator has one state with the voltage of said source below said first overvoltage level, the output of said comparator shifting to the other state with the voltage of said electrical supply at the first overvoltage level; and
    a feedback circuit connected between the output of the comparator and an input of the comparator, to modify the bias of the comparator so that the comparator output does not shift back to said one state until the voltage of said electrical supply drops to said second voltage level.

7. The transient suppressor of claim 1 in which said control includes:
    a counter which counts the switch transitions between on and off; and
    means responsive to said counter for inhibiting operation of the transient suppressor.

* * * * *